United States Patent [19]
Li

[11] Patent Number: 5,410,634
[45] Date of Patent: Apr. 25, 1995

[54] SELF-OPTIMIZING METHOD AND MACHINE

[76] Inventor: Chou H. Li, 379 Elm Dr., Roslyn, N.Y. 11576

[21] Appl. No.: 767,154

[22] Filed: Oct. 21, 1991

Related U.S. Application Data

[63] Continuation-in-part of Ser. No. 496,264, Mar. 20, 1990, Pat. No. 5,079,690, which is a continuation-in-part of Ser. No. 121,095, Nov. 16, 1987, Pat. No. 4,910,660, which is a continuation-in-part of Ser. No. 652,494, Sep. 19, 1984, Pat. No. 4,710,864.

[51] Int. Cl.$^6$ ............................................. G06F 15/18
[52] U.S. Cl. ................................................... 395/10
[58] Field of Search .................................. 395/13, 10

[56] References Cited

U.S. PATENT DOCUMENTS

| | | | |
|---|---|---|---|
| 4,368,509 | 1/1983 | Li | 364/148 |
| 4,472,770 | 9/1984 | Li | 364/148 |
| 4,697,242 | 9/1987 | Holland et al. | 395/13 |
| 4,935,877 | 6/1990 | Koza | 395/13 |
| 5,136,686 | 8/1992 | Koza | 395/13 |
| 5,148,513 | 9/1992 | Koza et al. | 395/13 |

Primary Examiner—Robert W. Downs

[57] ABSTRACT

A method for automatically developing new and improved software according to a prespecified performance criterion comprising: automatically planning experiment on selected control variables related to the software; executing the planned experiment; analyzing the experimental results to compare the performance characteristics of the various combinations of the selected control variables in order to determine that combination which improves or optimizes the prespecified optimizing criterion; coding the thus-determined combination in computer-usable form; and saving the coded computer software onto a software storage device. A machine which automatically develops new, self-optimized software according to this method is also disclosed.

44 Claims, 3 Drawing Sheets

Fig. 1

Prior Art

SELF-OPTIMIZING METHOD AND MACHINE

REFERENCE TO RELATED APPLICATION

Cross-Reference: This is a continuation-in-part (CIP) of my U.S. application Ser. No. 07/496,264, filed Mar. 20, 1990, now U.S. Pat. No. 5,079,690 which was CIP of my application Ser. No. 07/121,095, filed Nov. 16, 1987, now U.S. Pat. No. 4,910,660 which was a CIP of my application Ser. No. 06/652,494, filed Sept. 19, 1984, now U.S. Pat. No. 4,710,864. I hereby incorporate all these related applications and patents by reference into this disclosure as though they are fully set forth herein.

BACKGROUND OF THE INVENTION

1. Field

The invention relates to self-optimizing method and machine; and more particularly to multivariable, real-time self-optimizing method and machine, for operation in practical or nonideal conditions involving multiple errors due to defective knowledge bases, miscalibrated sensors, imperfect equipment, and statistical fluctuations.

2. Prior Art

Computer-controlled automation systems are widely used. All these systems are extremely powerful. With their uses, consistency is generally achieved together with the usually, but not necessarily always, associated improved profits, productivity, and product or service qualities ($P^3Q$).

Further, by transferring to machines human intelligence, rather than human skill, these systems have ushered us into this Second Industrial Revolution.

But human intelligence or knowledge bases only document averaged previous test results on old samples with equipment, materials, parts, procedures, or environment different from the present or future. Inherent are errors due to the various samplings, assumptions, or extrapolations, and repeated human interactions. These knowledge bases are often incomplete, inaccurate, biased, erroneous, out-of-date, and too generalized for uses in a particular automation task with a specific combination of equipment, procedures, materials, parts, and environment.

Detailed knowledge bases on modern technologies are particularly lacking. Even many old yet important technologies are not fully mastered or understood. Each of these technologies involves many processing steps often with unknown chemical, mechanical, electromagnetic, aerodynamic, fluidic, or other phenomena on the subatomic, atomic, microscopic, macroscopic, or other levels. Even the controlling variables in each phenomenon are often not completely known, and certainly have not been comprehensively studied. In fact, much R&D remains to be done in every field. Yet time is running very short in this highly competitive world. A new R&D method must, therefore, be developed.

For example, system dynamics of modern processes and equipment are generally ill-defined. Chemical and metallurgical reactions are often uncertain. The mechanism of catalysis is not completely known. Crystal growth is still an art. After millions of controlled welding experiments, the critical welding variables cannot yet be even identified among the very many possible. In the case of the new high temperature ceramic superconductors, the samples are still hard to make, shape, purify, reproduce, isolate, stabilize, confirm,, or even determine compositions.

Without reliable knowledge bases, the usual automation specialists would be at a loss in selecting the few among many manufacturing or servicing phenomena or variables to be controlled, in formulating the system dynamics models, in setting up the control equations, in determining the control constants, and in specifying setpoints for the control variables.

The fragile and unreliable knowledge bases often give only partial or invalid system dynamics models, oversimplified control equations, and inexact or misleading control constants and setpoints. In addition, all the setpoints are too arbitrary and round-numbered (e.g., 800° C. and not 796.768° C., 3 feet per minute, 20 gallons) to be possibly optimal statistically. The chance of these variables or setpoints being optimal at any time, not to say instantaneously or continuously, is nearly zero. Further, the optimal setpoints cannot be constant, as are assumed in present automation systems, but change with variations in time, equipment, procedures, materials, parts, and environment.

These conventional automation systems are also not smart and must be spoon-fed at every step via computer programs or master-slave instructions. They are not totally integrated or automated, and require constant human guidance, reviews, analyses, interactions, and supervision.

Due to this repeated human involvement, the conventional automation systems not only are greatly slowed down, but inevitably inherit the many defects of the inconsistent and imperfect human test planners, samplers, testers, data collectors and analyzers, communicators, and technicians. Humans are million times slower and less reliable than microprocessors in, e.g., memory recalling or storing, information inputting or outputting, data analyzing, communicating, and commanding or actuating.

In addition, usually these present systems merely passively adapt, adjust, correct, control, or regulate, in response to variations in the environment or a few control variables. Dealing with more than several interacting variables results in extremely large number of tests to be made; and in massive amount of data to be collected, conditioned, stored, and quickly or instantly analyzed. This is often impractical or impossible, because of the well-known problems of "combinatorial explosion" and "computer intractability," as has been described in the '864 patent.

Yet, modern technologies invariably involve many unpredictable, interacting, and rapidly changing control variables in such categories as: raw materials, vendors, batches, lots, and conditions; compositioning; processing equipment; procedures in each of the many steps in every process; and environment. Many phenomena are transient but highly nonreproducible yet unknown and critical.

Artificial intelligence (AI) technologies, particularly the expert systems, have been developed and increasingly used in various fields. But again the knowledge bases are often inadequate or deficient, particularly on developing technologies. The present expert systems are also costly, inflexible, qualitative, and often inaccurate and out-of-date particularly for complicated yet rapidly improving modern technologies. In addition, they too cannot handle the inherent large number of interacting variables.

Reliable and relevant knowledge is scarce and very costly. Up to now, the main bottleneck in the development of expert systems has been the acquiring of the knowledge in computer-usable form. Human knowledge often not only is fragile, costly, unreliable, but difficult to be translated for uses by machines. Codifying an expert's skill has always been a long and labor-intensive process.

Hence, experts conclude that machine learning is the key to the future of automation in general and expert systems in particular. The valuable knowledge must be manufactured, in bulk and at low cost. So far, however, no such machines exist.

Conventional AI development environments have difficulties in producing efficient real-time systems. This is due to the fact that the same code necessary to enhance the development environment tends to slow down the system during run-time. To overcome these limitations, AI system designers must embed the knowledge base (KB) into their own custom run-time AI shells to achieve real-time performance. Unfortunately, the deeper the KB is embedded into the actual code, the harder it is to change the KB when maintenance is necessary. Therefore, the AI system designer must constantly balance system performance versus ease of maintaining and manipulating the KB. An automation system with real-time KB generating capacity would thus be highly desirable.

Present automation systems also invariably contain various hidden errors of samplings, assumptions, extrapolations, scaling-ups, and statistical fluctuations of uncertain magnitudes. These systems are also at the mercy of other errors due to, e.g., miscalibrated sensors, imperfect actuators, drifting equipment, and partially damaged components. Any one of these errors can easily lead to unexpected inconsistencies and nonuniformities in, e.g., manufacturing or servicing results.

Accordingly, an object of the present invention is to provide improved self-optimizing machine and method;

A further object of the invention is to provide real-time self-optimizing machine and method capable of handling tens, hundreds, thousands, or more variables with little or minimum human guidance;

Another object of this invention is to provide close-loop, self-optimizing machine or method which can optimize practically continuously and instantly;

A broad object of the invention is to provide self-optimizing machine or method totally self-planned and controlled tests, performed on the very particular machine or method itself without relying on many assumptions, invalid scaling-up laws, and extrapolation from sampled test results obtained on other similar machines or methods; with the test data instantly analyzed for timely optimization results;

Another object of the invention is to self-optimize machine or method in practical or nonideal conditions by tolerating, neutralizing, or suppressing the effect of errors due to defective knowledge bases, miscalibrated sensors, imperfect actuators, drifting equipment, damaged components, and statistical fluctuations;

A further object of the invention is to provide self-optimizing machine or method which operates with deficient and minimal or practically zero knowledge bases, rapidly generates its own new knowledge bases through automatic R&D, and immediately and continuously replaces these new knowledge bases with still newer and more accurate or refined knowledge bases for continuously optimal results;

An additional object of the invention is to provide self-optimizing machine and method which actively computes, and automatically sets at, the instantaneous optimal combinations of the many relevant variables in various categories, with instant feed-back to supply data for immediate replanning, retesting, and reoptimiizng, all without human intervention;

Another object of the invention is to manufacture, in bulk and at low cost, reliable knowledge bases for the instant development of relevant expert systems;

Yet another object of the invention is to provide self-optimized computer system software and service for businesses, offices, education, training, engineering, reverse-engineering, designing, processing, manufacturing, distribution, R&D, communication, reconnaissance, surveillance, project management, data analyses, decision making, running supercomputers or parallel computers, multimedia computing, electronic data interchanging, computer operation and application, and other applications;

A further object of the invention is to provide computer-generated software or creatures which, all by themselves and with blinding speed, reproduce or multiply, mutate or undergo spontaneous genetic changes in the best possible way under a given environment.

Further objects and advantages of my invention will appear as the specification proceeds.

SUMMARY OF THE INVENTION

In summary, the present invention provides a method for real-time self-optimizing, with instant or substantially continuous, closed-loop feed-back control but without human guidance, intervention, and interaction, by automatically, instantly, repeatedly, and preferably continuously: planning efficient, statistical design matrix of n tests on m variables with n being less than 2 to the (m-4)th. power ($\frac{1}{8}$ replicated, or one eighth of the required test number for the complete, m-variable factorial experiment), adjusting the conditions of the m variables according to the design matrix; performing the necessary tests; collecting and recording the n sets of data on the critical performances to be optimized; analyzing the collected data to determine the functional relationships between the m variables and the critical performance or performances and the instantaneous optimal variable combinations; setting the m variables to the thus-computed optimal combinations before these combinations change; and feeding back information on the status of optimization to achieve closed-loop feed-back control. A machine operating on the basis of this method is also disclosed.

DESCRIPTION OF THE DRAWINGS

The invention and its further objects and features will be more clearly understood from the following description taken in conjunction with the drawings in which

FIG. 3shows the flowchart of my self-optimizing machine and method.

DESCRIPTION OF THE PREFERRED EMBODIMENTS

The method and machine of the invention are of general applicability for self-optimizing many and various automation systems and processes, in real time and with lightening speeds in the dealing of the many, many variables, which normally require thousands, millions, billions, or more computational steps.

Figure 1:
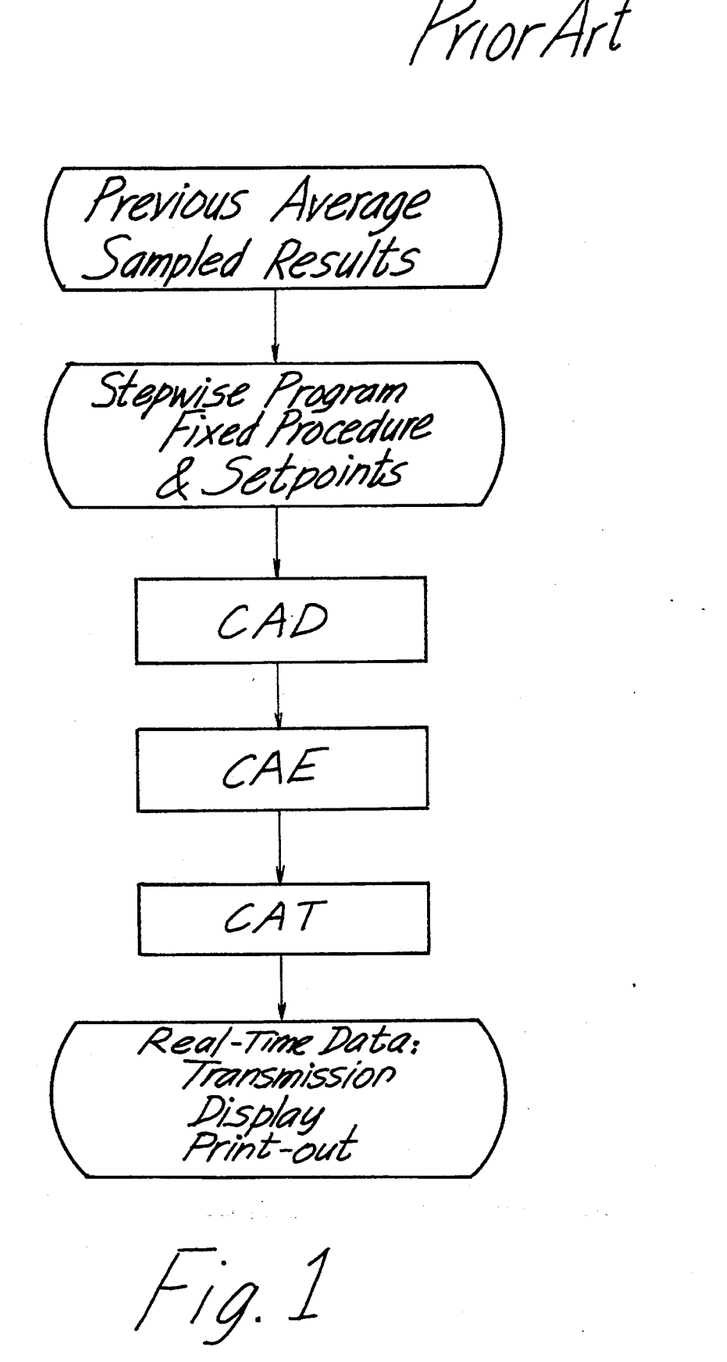
FIG. 1 shows the flowchart of the present automation systems.

FIG. 1 shows the flowchart for the present automation systems. Note that these systems totally depend on the imperfect and error-prone human knowledge bases from averaged previous sampled results. Also, there are no mechanism to eliminate, suppress, or even detect errors from any sources. Hence, errors in, errors out.

Thus, a fundamental flaw in present automation systems is the assumption that there exist human experts who know exactly and accurately everything: the exact number and type of important variables and their interactions, system dynamics models, detailed solutions of the intricately coupled control equations, exact control constants, and optimal setpoints. Also, these experts and other personnel related to the automation do not err. In reality, this is far from the truth.

As a result, wrong models based on incomplete or imperfect understanding often must be used, with misleading, dangerous, or disastrous result. Classical examples include the Space Shuttle disaster, Korean Airline shoot-down, Chernoby reactor failure, and Napolean's and Hitler's Russian invasions. In the last example, Napolean or Hitler gathered all the French, German or other experts to help program the step-by-step operational procedures for his human and mechanical robots, based on meticulously collected massive, accurate, scientific, but misleading previous sampled weather data, with disastrous results to his whole army on the Eastern Front.

Figure 2:
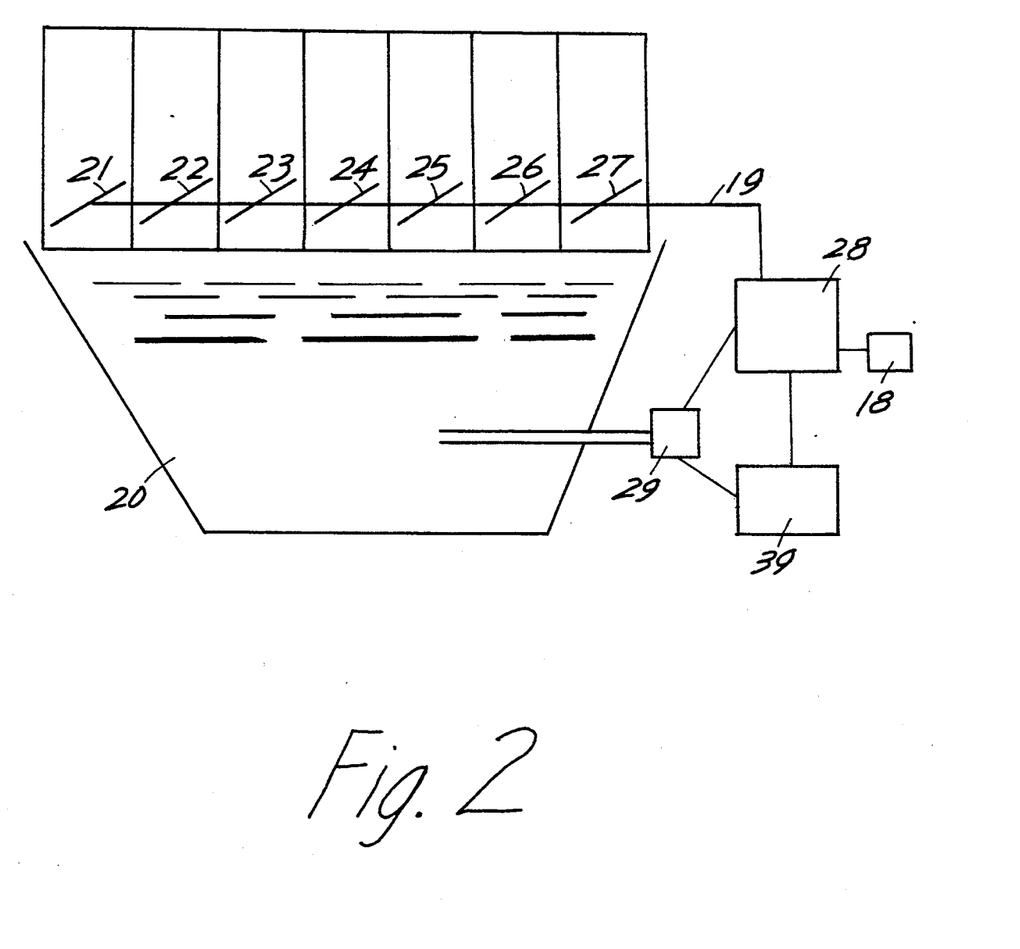
FIG. 2 shows a self-optimizing furnace for making special iron-base alloys.

FIG. 2 of this application, and FIG. 1 of '864 and '770 patents as well as FIG. 2 of the '509 patent, all show a machine 20 in the form of a furnace to make special iron-base alloys. The furnace self-optimizes, in real time, relative to a specific performance, e.g., hot tensile strength of the resultant alloy produced on the furnace, in response to variations in a fixed number m of variables. For ease of illustration, m is only 7 and all these 7 variables are 7 alloying elements. The composition of these seven alloying elements can be changed continuously and without steps. These variables are continuous variables.

This machine or furnace has a built-in microprocessor 28 which first self-plans a statistical design matrix of operating or alloying procedures or conditions for the automatic R&D according to, e.g., the method and computer program given in the '509 patent. Specifically, 8 tests or alloying compositions are planned.

Thus, while a complete seven-factor (at two levels each) experiment requires the making of $2^7=128$, tests, this computer-planned fractional factorial designed experiment makes only 8 tests. That is, only a small fraction (i.e., one-sixteenth) of the required number of 128. Technically, this is called a one-sixteenth fractional factorial experiment.

The microprocessor then directs, through the transmission line 19, the seven actuators or alloying elements feeders 21–27 to feed successively according to the design matrix. The furnace then sequentially makes the 8 (=n) successive tests or melts of iron-base alloys, which are sampled by sampler 29 and tested on tester 39. The test results on the critical product performance, i.e., hot tensile strength of the resultant alloys, are transmitted to the microprocessor 28 (with attached memory 18) for data analyses to compute, as shown in the '509 patent, the desired functional relationships including: effects of the various variables or alloying elements, the instantaneous optimum combination of the variables and/or the steepest ascent path, since the composition variables are continuous variables. The microprocessor 28 then redirects the feeders 21–27 to provide the optimum combination of the alloying elements into the molten iron melt in the furnace 20 for optimized alloy manufacture. Periodically, i.e., every hour, minute, or second, the planning, sampling, testing, data analyzing, and feeders actuating and setting are repeated so that the furnace conditions are always maintained optimal. Other details of the principle, operation, and results of the self-optimizing method and machine are provided in my U.S. Pat. No 4,910,660; 4,710,864; 4,472,770; and 4,368,509; and other U.S. Patents elsewhere incorporated.

Minor modification of the above self-optimizing machine yields drug-searching or administering machine continuously self-optimized to dispense the instantly optimum combinations of drugs such as chemicals, plants, animal tissues, bacteria, genetic or biochemical materials, ... through the feeders 21–27 into a drug-preparing or feeding device. Such a device, in the form of hypodermic needle, mouth-feeder, or implanted feeder, will dispense the optimum combination of drugs either periodically or continuously. The tester 29 is used here to test the medical conditions of the human, animal, or plant patient as to, for example, vital functions of the organs, chemistry of the blood, urine, and other liquids; or other data or performances to be optimized. Such a machine can also feed food, nutrients, vitamins, or even educational or training materials to plants, bacteria, animals, or humans with optimal equipment, procedures, and environment to achieve self-optimized physical or mental growth conditions of the object at all times.

To search or screen among thousands or millions of drugs for a few that can cure a critical disease such as cancer or Aids, my sequential screening technique given in the Journal of American Statistical Association, Vol. 57, pp. 455–477, 1962, may be used, as has been disclosed in my '509 patent referred above. In this way, optimum combinations of drugs can be systematically researched and found, to be delivered to the patient in real time.

Figure 3:
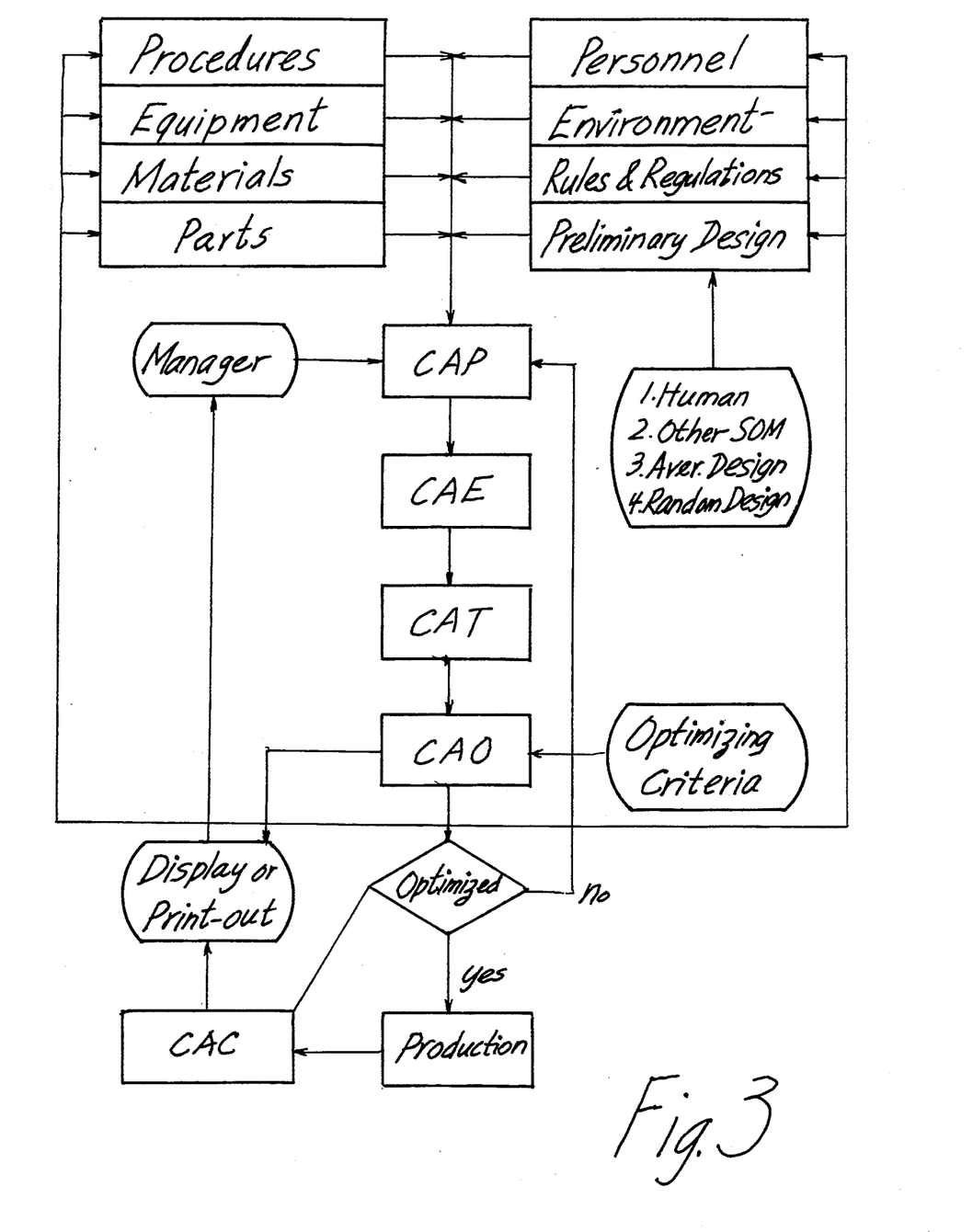

The flowchart of the new system is shown in FIG. 3. Multiple sensors sense numerical data (having much higher information content than yes-no question-answers in present expert systems) on the system and product or service qualities and also on the many interacting, independent or controlling variables in various categories such as procedures, equipment, materials, parts, and environment. With this information, the microprocessor (e.g., 28 in FIG. 2) instantly and automatically plans (CAP or AIP) efficient statistical experiments around an experimental point in the m-dimensional experimental region according to, e.g., designs of the highly fractional replicate type as shown in the '509 patent and the Worksheet paper given in Chemical Engineering, Apr. 2, 1958. Without interrupting the system in the performance of its assigned tasks, i.e., automatic manufacturing or servicing, the computer-planned designed experiments are continuously and automatically executed (CAE) to achieve successively the required combinations of variable settings (or elemental compositions) through, e.g., the actuators 21–27 in FIG. 2 for continuous and automatic testing (CAT). Test results on the dependent or controlled variables (e.g., hot tensile strength) including the system and product/service performance data are continuously, automatically, and instantly analyzed and optimized or maximized (CAO), based on specified or computed optimizing criteria, such as the various system and task goals in proper weighing indices for a particular situation (e.g., only maximum hot strength in the example of FIG. 2). More specifically, the instantaneous optimal variables combinations (or elemental compositions) are continuously determined and, through actuators, set and reset.

The '509 patent disclosures the specific software to compute the "effect" or partial derivatives of the m variables on the m-dimensional performance response surface. These derivatives provide the basis for climbing the hot-strength response mountain along the steepest ascent path, to reach the instantaneous optimum point in the m-dimensional experimental region via the method fully described in the prior art, particularly the '509 patent and my Worksheet paper referred to therein. Alternately, the microprocessor can instantly rank the n test results to determine the optimum performance on test k which, by definition, has the instantaneous optimum variables combination. The next self-optimizing cycle, if needed, will then involve automatic R&D performed at a known computer-recorded time around this new experimental point represented by test k.

The '509 patent also teaches a method to determine the interaction or combined effects, couple (i,j), of any two of the m variables i and j. These interactions are generally negligible, particularly when the units of change of the m variables are small and linear effects predominate.

All the sensed system and product or service performance data are then evaluated to see if the system is optimized. If not, the above optimizing cycle is repeated. If optimized, operation of the system is continued, with 100% continuous and automatic checking or quality control (CAC or CQC) of all the sensed performance data for 100% traceability.

The results of the data analyses in the CAO and CAC steps can be real-time displayed or printed-out on a word-processor in the form of research papers/reports or operating manual describing comprehensive statistical experiments; instantaneous, complex system dynamics; functional relationships between the control variables and the system and product or service performances; new and realistic specifications on these performances; best system modifications and operating procedures; optimal raw material compositions, vendors, lots, and conditions; best equipment layout; and other rapidly generated, reliable, but low-cost knowledge bases. These knowledge bases, including the PID control constants, are stored in the computer memory for subsequent computer or human use in, e.g., testing new hypotheses, designing improved products, systems, or softwares, and the like.

Note that such displays or print-outs are not for the raw sensed data, as is usually the case. Rather, they are extremely useful and commercially valuable conclusions from the comprehensive, systematic, relevant, and exactly but automatically executed R&D. Most of such information will be totally new and not obtainable for months or years by teams of specialists because of the combinatorial explosion problems mentioned above.

These knowledge bases are, furthermore, manufactured in great bulk at very low cost, and are instantly machine-codeable so that "expert system" can be easily generated at a small fraction of the cost and time compared to the conventional approach. The development of expert systems is a well-developed art. See, for example, P. Klahr's book on "Expert Systems: Techniques, Tools, and Applications," published by Addison-Wesley in 1986; and W. B. Genarter's paper entitled: "Expert Systems: Limited but Powerful," in IEEE Spectrum, August, 1983.

Each expert system typically has as its components the knowledge base, an inference engine, a knowledge acquisition module, and explanatory interface.

My self-optimizing machine always has a knowledge-acquisition module to generate in the CAO and CAC steps the required knowledge bases in a particular domain of interest. These knowledge bases are automatically codeable into an inference engine to provide "advices" as its outputs. In the steel-making-furnace operation given above, for example, the machine-generated rules may be: "IF hot strength is needed, THEN in the order of decreasing effectiveness one should increase V, Cr, Mo, Nb, and C, but decrease Mn and Ni" (See "Effect" column in Example of the Worksheet reference); "IF maximum percentage effect is needed, THEN one should add V;" and "IF maximum hot strength is needed, THEN use the following best combination of the seven elements: 10.4% Cr, 1.2% Ni, 0.66% Mo, 0.18% V, 0.58% Nb, 0.24% Mn, and 0.80% C," as indicated in line 25, Trial 11 of Example 1. Also, "IF V is 0.18% and Cr is 10.4%, THEN Mo should be 0.66% and NB 0.24%". These rules can easily be codified and printed out with standard formats requiring merely the filling of the variable names such as Cr, Ni, Mo, ... and the numerical values such as 10.4, 1.2, 0.66, ...

Thus, my self-optimizing machine readily and automatically generates these and other similar rules in computer-coded form ready for use in instant machine expert systems. The displays, print-outs, and transmitted data (FIG. 3) provide the "explanatory interface," as in the conventional expert systems. FIG. 2 also shows that in some cases, a human interfacing may be desirable to help manage or control the self-optimizing process. In these cases, human manager may be needed to, e.g., supply critical data needed for more timely self-optimization.

To fully utilize my self-optimizing machine, however, these "rules" are preferentially instantly and automatically implemented through actuators without introducing any delays or errors due to the presence of humans in the loops.

Even probabilistic statements in the rules Can be provided, if needed, because the automatic statistical experimentation during each self-optimizing or R&D cycle provides a valid "experimental error," from which confidence limits can be derived. The errors in each estimated effect or interaction, for example, can be estimated. See standard textbooks on statistics.

In this way, my self-optimizing machine solves the present main bottleneck in the development of expert systems, i.e., the acquisition of knowledge in computer-usable form; and meets the and keenly felt need to automate the knowledge generation process.

Thus, the machine-generated information of my invention forms the basis of a new kind of artificial intelligence or knowledge bases. These bases are comprehensive in the number of control variables, the range of these variables, and the scope of the experimental region. These knowledge bases are also relevant, timely, reliable, less error-prone, and possibly instantly available.

Note that the self-optimizing process is performed on the very automation machine or object of interest and in actual operation, with the exact materials, parts, procedures, equipment, and environment. In addition, the test data are quickly collected, analyzed, and used on the very machine or object to be optimized during the same actual operation. Hence, the various ever-present and often critical errors of sampling, extrapolation, and scaling-up are minimized or eliminated.

A unique feature of my self-optimizing technology is that the computing time in each self-optimizing or automatic R&D cycle may take only milliseconds or microseconds, as will be shown. Delays due to mass and thermal inertia or diffusion effects, however, generally are much larger than this negligible computing time. These motioning, positioning, heating, cooling, and stabilizing delays primarily determine the duration of each automatic R&D or self-optimizing cycle. Still, with suitable actuators, sensors, and equipment design or layout, the optimizing cycles may indeed be very short. These short or even instant optimizing cycles make the optimizing process not only simple and possibly, but in real time and often practically continuous, even for complex, rapidly changing conditions or processes involving hundreds or thousands of control variables.

Because of the efficient statistical designs and simplified data analyses, the CAP-CAE-CAT-CAO optimizing cycles may each take only a small fraction of a minute or second, if the testing, actuating, and data sensing have minimal delays. As a specific example, dealing with a case involving 127 ($=m$) variables at two levels each normally would require making $n=2^{127}=1.701 \times 10^{38}$ conventional tests, and about $N = 3 \times n \times n = 2.895^{76}$ multiplications, or $8.738^{43}$ years on a nanosecond computer for the data analyses. Using the technique described here and in the '509 patent, it now requires making only 128 ($n=2$ to the 7th. and not 127th.) tests, and $N = n \times$ logarithm of n to the base of $2 = 218 \times 7 = 896$ additions/subtractions and 128 divisions or 896 shifts to the right, for a total of 1,024 or 1,792 computational steps or 1.02 or 1.79 microseconds, respectively, on the same nanosecond computer. Even on a microsecond computer, the total data analysis time for each self-optimizing cycle with 127 variables is merely 1.02 or 1.79 milliseconds. The CAP step also takes about 1 microsecond or millisecond on the respective nanosecond or microsecond computer. Hence, if sensing, actuating, and testing (CAE and CAT) are nearly instantaneous, the entire optimizing cycle or system response time could thus indeed be a fraction of a minute or second, through several milliseconds down to several microseconds. The optimizing cycle time is at least sufficiently fast to meet the requirements of practically all modern technologies.

Our new system would thus make many "impossibly complex" optimizing tasks not only possible but practical and possibly in real-time.

In operation, the self-optimizing machine first reads the optimizing criteria on the machine or product or service performances with their different weighing indices, and the number of control variables with their allowable ranges. It is then totally up to the new machine, all by itself, to continuously plan, execute, compute, optimize, and implement the instantaneous optimal variable combinations or automatically determined setpoints.

Any pre-existing knowledge bases, if available, are used merely in the preliminary design for each variable in the first self-optimizing or automatic R&D cycle only. If no knowledge bases are available, the self-optimizing machine starts the preliminary design for each continuous variable with the average or midpoint of, or even a random number within, the given allowable range. After the first cycle, comprehensive, relevant, timely, and error-free new knowledge bases will be produced. Even these new knowledge bases will, in turn, most likely be immediately replaced by still newer and more accurate or refined knowledge bases with additional self-optimizing cycles. As shown above, each such self-optimizing cycle may be very short if rapid electrooptical sensing, actuating, and testing are possible.

As a by-product, the system thus generates, prints out, stores in memory, or transmits to other self-optimizing machine vast quantities of the error-free, constantly updated, and otherwise unavailable and very expensive knowledge bases. These knowledge bases are suitable for human uses for innovations, hypotheses testing, and advanced product development. These knowledge bases are also useful for present automation systems, as preliminary designs for these self-optimizing machines, or for the development of instant expert systems as described above.

This transfer of intelligence from machine to humans or to other machines may signal the beginning of the Third Industrial Revolution.

Advantages of the self-optimizing machine are many, particularly when compared to the present automation systems. The purpose of present automation systems is to control only certain selected variables within specified limits. These limits may not be optimal, as shown above. Even the selected control variables do not always certainly or reliably affect the productivity and product or service cost/qualities. Much, therefore, depends on the reliability of the knowledge bases; the many assumption, extrapolation, and statistical variations; and equipment conditions, calibrations, and drifts.

On the other hand, my self-optimizing machine optimizes directly the bottom line, i.e., productivity, cost, and product or service qualities ($P^3Q$). Improper control models or constants, and variable setpoints thus can do no harm. Because of the unique operation flowchart (FIG. 3), many of the deficiencies of present systems are minimized or eliminated. In particular, the condition of the sensors and actuators have minimal effects on achieving the desired optimization of the bottom line, as will be shown below.

When the control variables are sensed with miscalibrated sensors or set with imperfect actuators, for example, the resultant "instantaneous optimal combinations" as sensed with the miscalibrated sensors and set with the imperfect actuators are still the most relevant, useful and, in fact, the best for the particular self-optimizing machine at the specific time with the particular environment to achieve the required optimizing criteria or goals. The miscalibrations and imperfections are always exactly self-compensating.

For example, in the conventional system, the specified setpoint may be 500° C., to be sensed by a K-type or Chromel-Alumel thermocouple. If, however, the K-type thermocouple is miscalibrated or if a J-type Iron-Constantan thermocouple is misused, the results can be dangerous in present automation systems. However, in my self-optimizing machine, the zero and proportionality constant calibrations of the thermocouple are unimportant. Even a misuse of the thermocouple merely changes the proportionality constant with a proportional change in the apparent "effect," but no reduced efficiency in reaching the optimized bottom line of profits, productivities, and product qualities.

As another example, a present automatic processing system may specify an optimal control temperature of 100° F. Assume a Fahrenheit thermometer is specified for sensing, but a Centigrade thermometer is misused with a zero-point correction off by 32° F. and a proportionality constant off by $(9/5-1)=80\%$. The conventional controlled process will then be out of control. Still, in my self-optimizing machine, the automatic R&D will determine and set at the self-determined, true instantaneous optimal combinations (or setpoints). The response surface will still be climbed in the steepest ascent manner, even though this response surface has been shifted laterally (because of the zero miscorrection) and has a different height scale (because of a changed proportionality constant).

Sensor zero miscalibration of more than 32° F. or $(32/100=32\%)$ of the optimal set value and proportionality miscalibration of more than 80% in temperature, pressure, voltages, current, dimensions, velocities, flow rates, . . . can be similarly tolerated. Actuator or other equipment imperfections due to drags, backlashes, damages, and too wide clearances are also tolerable for similar reasons. In addition, the effect of sensor noises, actuator friction, and periodic disturbances or environmental changes are also minimized because of the statistical averaging effects between tests of the same or different self-optimizing cycles.

Similarly, equipment drifts are also tolerable if the automatic R&D cycle time (e.g., 1 or $2/\frac{1}{2}$ sec) is less than the drift cycle time (e.g., 5 or 10 sec).

Hence, with my self-optimizing machine, achieving the truly meaningful bottom-line, optimizing goals on product or service costs or qualities is no longer a hostage to the quality of the existing knowledge bases, the correctness of the control models or equations, the exactness of the given setpoints, and the conditions of the equipment.

My optimizing machine is thus flexible and error- or fault-tolerant. It can handle practically any number of important, possibly important, or interacting variables, on the most reliable microprocessors, without much regard to the computing speed or memory size. Redundancy of parallel processing may, however, be also employed for additional reliability and computer speed, respectively.

The self-optimizing machine is, therefore, smarter; better; smaller; lighter; faster; and more reliable or flexible than present automation systems, yet may save enormously for its employers while mass-producing low-cost but uniformly optimal-quality products or services.

Most importantly, the self-optimizing machine can timely perform the necessary, complicated optimizing tasks for the modern, complex yet rapidly changing automation tasks that probably no other systems can.

Further, even the minimum number of tests in each R&D cycle still provides virtual statistical replications, and thus yields averaging effects to counter the statistical fluctuations and chance combination effects due to sampling, actuator backlashes, and equipment conditions, . . . This is partly because the efficient statistical designs are so balanced that the effect of each control variable can be independently evaluated as if the entire experiment were performed just for this one variable with the other variables all kept constant.

My self-optimizing machine parallelly and automatically performs, depending on need, at least a few of the following important operations during each automatic R&D or self-optimizing cycle:
1. Comprehensive and systematic R&D;
2. Optimal manufacturing designs or servicing procedures;
3. 100% quality control;
4. Procedure or equipment modifications;
5. Materials and parts selections;
6. Use of environmental changes for maximum benefits;
7. Prototype or finished products manufacturing; and
8. Rapid generation of reliable and comprehensive knowledge bases.

Thus, this new machine should be significantly improved over conventional automation systems (FIG. 1). These later systems perform the various tasks list above sequentially and successively, and even this very slowly, inefficiently, and often unreliably.

The self-optimizing method and machine of the invention can be used for many automation systems in various industries including manufacturing, servicing, office, military, farming, medical, and education.

As an example, the invention is also useful to self-optimize, in real time, the physical or mental growth activities of a living being selected from the group consisting of human, animal, bacteria, and plant. Such activities include: body growth, physical strengthening, sporting, learning various skills such as speaking, singing, reading, memorizing, swimming, foreign language, and other subjects. The flowchart of FIG. 3 is equally applicable in these cases even with the same microprocessor and basic computer programs for the CAP, CAE, CAT, and CAO steps, as described above. The sensors and actuators used, however, are generally different from those used in the self-optimizing furnace of FIG. 2. The specific performance or activity characteristic used as the optimizing criteria will, of course, also vary depending on the activities involved ranging, e.g., from learning speed, comprehension, growth rate, to others, as is well known to the skilled person. The controlled variables also may include growing, training, and educating procedures; training or growing materials (food, books, recorded tapes, . . . ); parts; and environment (such as temperature, humidity, noise or music type, intensity, and tempo, . . . ).

To self-optimize in real time the learning process of a human such as a child, one may, according to the description given above and in the '864 patent, sequentially cause the human to do the specific learning activity n times in succession while the conditions of the m selected variables are simultaneously changed according to a design matrix. The m variables may relate to the learning equipment, materials, parts, procedures, and environment, while the optimizing criterion may relate to the speed and comprehension of learning, possibly directly measured and scored by the microprocessor.

Similarly, in a self-optimized growth or development process of objects such as human, animal, bacteria, plant, or even software for computer operation or application, the object or "creature" is caused to develop (i.e., grow, improve, or optimize) in n different tests by suitably actuating the m growth variables according to the design matrix. The specific performance to be optimized here is usually the growth rate, maximum growth, cost per given growth, and environment impact.

The self-optimizing method of the invention is also useful for other financial, business, office, factory, military, educational, and scientific applications. Even many computer softwares can thus be not only automatically but optimally generated, modified, and used. Here, the same flowchart of FIG. 3 is used. The optimizing criteria may be the usual productivities, product or service costs, profits, and reliability or accuracy. The control variables mostly are different procedures, equipment, and software parts. The physical material and environment variables are often unimportant. The procedural variables may involve the different merging and interacting of various programs or parts of the same program; use of different mathematical or physical/chemical models, equations, or formulas; numerical computational techniques such as for finite element analyses, differentiation or integration, interpolation or extrapolation, root-determining, in different softwares. The procedures or parts variables may also involve the finite element grid shape and size; number, location, and contents of the various subroutines; and the location, size, starting and finishing points, and step size of the do loops. The equipment variables are often important because each microprocessor, disk or tape drive, monitor, printer, modem, transmission line, . . . has unique operating or performance characteristics such as speed, minimum memory size, reliability, The number of control variables in software optimization can also be very large. A simple, 500-line computer program may, for example, contain 20 do loops. As indicated above, each do loop may have three variables: the starting and ending points and the step size. In addition, these variables can be varied at many, not just two, levels or conditions. Varying only these three variables in all the 20 do loops at 16 levels each would thus require $16^{60} = 1.767 \times 10^{72}$ tests (much over thousands of tests) for the complete factorial experiment. Hence, the combinatorial explosion problem again is present. Yet many, many other variables may be added as shown above. To study the variables at 16 levels each, the same fractional factorial design matrix given in the '509 patent may be used but with four parameters assigned to each of the control variables. This is so because $2^4 = 16$.

Again, for the self-optimizing machine, the software optimizing task such as software generation or usage, computer simulation, and computer aided design (CAD), engineering (CAE), or training (CAT), . . . is first defined. The optimizing criteria in different weighing indices are next given. The number, type, and allowable range of the variables in different categories are then fed. As shown, this fed information may include the number, type, location, operating characteristics, . . . . of the different coprocessors or on-site slave microprocessors, monitors, disk or tape drives, telecommunication equipment, modems, printers, . . . ; and the number, type, and characteristics of the different subroutines, do loops, or numerical analytical methods; . . .

It is then up to the master processor in the self-optimizing machine to continuously and automatically plan (CAP) or automatically and instantly plan (AIP), and direct the various optimizing steps such as CAE, CAT, CAO, and CAC and, in addition, repeat the self-optimizing or automatic R&D cycles as needed. The effect of using a particular equipment, procedure, or software part is then determined, and the interactions of the variables are computed. One or more of the optimizing schemes described above are followed. The optimal combination of the variables is determined and set, redetermined and reset, so that the software generation, modification, application, . . . tasks are optimized statically, or continuously in dynamic situations. In these software-related tasks, no physical products are manufactured or serviced, yet the results are Just as rewarding. These results may be self-optimized CAD, CAE, computer integrated instruction (or training), simulation, battle management, signal or image processing, sensor data fusion, communication, reconnaissance, surveillance, command and control, weapon delivery, automatic defense, geopolitical assessments, financial data analyses, and stock, option, and commodity trading strategy generation and execution.

As another example, a new, multimedia computer and software can be developed to provide to an object or receiver continuously varying but controlled sound, smell, lighting, temperature, humidity, pressure (e.g., hot or cold breeze, Jet, or wind), text and moving or still pictures on the monitor display, and brain-teasing, mind-relaxing, muscle-exercising, . . . , materials or equipment, and other factors that stimulate the object physically, mentally, psychologically, and physiologically. Designed and operated according to my self-optimizing method, this multimedia computer can be used to achieve an integrated, instantaneously optimal effect on the physical, mental, psychological, or physiological condition of the object or receiver.

Available operation and application softwares or systems often limit the capabilities of computers. With my self-optimizing method, disc or computer operation systems can be made to have self-optimized softwares to optimally turn a set of electronic chips and circuit boards into a most efficient working brain. As a self-optimizing creature, this activated brain can respond to instructions in the best manner, according to such usual criteria as performance speed, efficiency, and reliability.

Application softwares are put in after the operation system to make the computer perform specific tasks, like processing words, constructing spreadsheets, doing income taxes, engineering designs, processing or manufacturing, managing an institution, an office, a plant, business, or project. The application softwares can be similarly self-optimized.

The prespecified optimizing criteria for a computer software generation, modification, use, maintenance, or performing a specific function may be a feature selected from the group consisting of cost of development, productivity, smallness, accuracy, efficiency, utility, reliability, robustness, maintainability, flexibility, memory requirement, output quality, and computing or analyzing speed.

The self-optimizing technology may be used to have the computer self-plan computer experiments on the different control variables of various categories. The computer then directs the execution of the planned experiment, analyzes the experiment results to compare the performance characteristics of the various combinations of the selected control variables to determine the improving or optimizing variable combination, codes the thus-determined combination in computer-usable form, and saves the coded computer software onto a memory disc. The computer often also acts as both the various sensors and actuators.

No one knows very much about how to program parallel computers. But applying my self-optimizing technology to a simple computer program or a commercially available program, such as DOS, Lotus 1-2-3, Work Perfect, more efficient, clever, and error-free programs may be produced after several self-optimizing cycles of software modification and improvement. These new programs are the result of automatic software R&D that systematically and comprehensively searches and analyzes the equivalent of millions or billions of new test programs. This achievement would be impossible with the present methods of program generation and evolution because of the necessarily slow, unreliable, and costly human involvement. When human-computer, computer-computer, computer-software, software-accessories interactions exist, the combinatorial explosion problem becomes even more serious and the self-optimizing methodology may be absolutely necessary.

There is a new technology called "artificial life" being developed to create softwares whose behavior mimics that of living creations. The newly produced computer programs can actually evolve into more powerful programs through their own interaction and merging to create a new generation—a Darwinian process similar to that of biological organisms. Such evolution could produce software more reliable that that designed by human programmers, who cannot anticipate all the potential ways in which their software can fail.

My self-optimizing method is even more reliable and powerful than the Darwinian approach. For example, the $16^{60}$ tests (or nodes in the 60-dimensional experimental region or space) indicated above to search or design an Optimized (not just improved) 500-line instruction program containing 20 do loops cannot be handled without the continuous automatic planning (CAP) of fractional factorial experiments. The saving in simulation or search tests is not just 10, 100, 1000 times, but $10^{69}$ times. A modern financial, industrial, or military computer program may contain over 5- or 10-millions instructions, necessitating the use of the self-optimizing method.

As is well-known, the statistically designed experimental plan is highly reproducible. Even with highly fractional factorial experimentation, the automatic R&D experimentation can systematically and efficiently search or analyze the entire m-dimensional experimental region or space, in a non-random, reliable, uniform, and reproducible manner, for determining that variables combination which improves or optimizes the performance criterion.

As shown above, the computerized automatic experimentation for, for example, software development contains a series of computer-planned and computer-executed, preferably recycled self-optimizing experiments. Each such experiment involves a set of n statistically designed software tests planned to generally center around a specified experimental point in a m-dimensional experimental space, for testing in the n tests the m selected control variables for their effects or best combination on the software performance.

Thus, my self-optimizing methodology when applied to rapid or instant knowledge acquisition, prototype modeling, and software development, management, improvement, usage, reuse, or error, defect, and virus detection and elimination, will not merely improve after numerous time-consuming searching, learning, or adapting trials and errors, but systematically and effectively optimize in real time, the performance as to cost, productivity, accuracy, reliability, and availability, maintainability, and human-computer interfacing. Real-time software design, development, testing, implementation, and maintenance is therefore possible. The resultant self-optimizing systems will also identify performance problems before they arise, optimally determine or reallocate current resources, and decide on future capacity requirements. In many situations, this new methodology will be able to quickly process information and perform decision aid tasks.

Numerous other self-optimizing systems have been designed. One such system actively suppresses noises at a designated receiving point by continuously performing n self-planned tests on m acoustic variables. These variables relate to the number and location (x, y, z) of noise generators (acoustic actuators), and their frequency, time-varying amplitude, and noise waveforms. The instantaneous optimum variables combination is the one that produces a combined counternoise which best minimizes the noises to be suppressed. In an automobile or truck, the various noises may come from the engine, tires, and environment (wind, rain, traffic, other cars, . . . ). Four microphones as the noise generators may be located at the four corners inside the automobile, and the object of the optimization is to minimize the noise at the position of the receiving ears of the driver or a particular passenger or passengers.

A similar system may be designed to actively suppress or control the vibrations (from the engine, shock absorbers, road irregularities, and environment factors) on the car. Four vibration actuators may be installed at the four wheels. The sensor senses the shock, vibration, acceleration, or even medical or physiological conditions of on one or more particular occupants in the car.

A self-optimizing computer program has been developed to teach mathematics. This program optimally teaches the students on handling addition, subtraction, multiplication, and division regardless of his or her age, sex, background, physical and mental condition, time of the day or week, or other factors. In this program, the computer serves both as the actuator to give two numbers to be handled, and as the sensor to sense the speed of the mathematical operation and accuracy of the results. The number of digits in the numbers are automatically increased and decreased according to these speed and accuracy optimizing criteria on a 50:50, 60:40, or 40:60 weighing ratio. In addition, the window size and background color of the monitor, location, size, and color of the numbers on the monitor, the intensity of the colors, environmental factors such as room lighting, temperature, humidity, and air circulation, encouraging rewards in words when correct answers are given, and other learning variables can be systematically varied in designed experiments to determine and set at the instantaneous optimal variables combinations for best teaching results. In this as well as other cases, the machine continuously gives the best variables combinations or true setpoints, but also the teaching or learning system dynamics models. From these models, relevant control equations can be set up and, if simple, solved and the control constants (e.g., PID constants) determined.

According to the method of the invention given above, I have developed a real-time self-optimizing heating system or machine. This machine has a 64-K, Apple II Plus computer, a Lindberg Type 54032 or 55035 furnace, a Chromel-Alumel thermocouple sensor, and a 25-ampere Omega solid-state relay as the actuator. A $3\frac{3}{4}$-bit A to D converter, a special parallel interface board, and some transmission lines complete the hardware. This machine does not work on a fixed, control program based on preconceived heating dynamics model, predetermined control constants, and setpoints, as is usually the case. Rather, its Apple computer plans its own test design matrix according to the technique described above; directs the relay actuator to be on and off at planned temperatures for designed lengths of times according to the design matrix; collects and analyses the sensed temperature data to determine, with or without the use of the steepest ascent method, the instantaneous, unique combination of the variables which optimizes the machine performance, e.g., minimum temperature fluctuations, absolute temperature deviations from the set temperature, time to reach set temperature, . . . ; and sets the machine accordingly. The control (e.g., PID) constants may also be continually self-optimized in cases where the system dynamics and control equation are well-defined. Even with the large thermal inertia, within minutes of turning on the machine is heated to and controlled within typically a fraction of a degree Centigrade from the set temperature of, e.g., 500° C. The sensitivity on this machine is limited by the A to D converter. Some other real-time self-optimizing machine have also been developed and successfully tested.

In addition, the '509 patent also points out the various relevant prior arts including Hardaway's extreme parameter search control system (U.S. Pat. No. 3,446,430), Russo's combined pattern recognition and linear regression network (U.S. Pat. No. 3,576,976), Smith's digital process control (U.S. Pat. No. 3,694,636), and Barron's control system (U.S. Pat. Nos. 3,460,096 and 3,519,998) which provide background for the design and use of control systems, system programming, actuators, calculators, timing circuits, A/D or D/A converters, storage memories, sensors, comparators, logic devices, sign detectors, . . . which are often useful in the practice of my invention. I hereby incorporate the essential materials of these patents into this application by reference.

The invention, as described above, is not to be construed as limited to the particular forms disclosed herein, since these are to be regarded as illustrative rather than restrictive. Various combinations, equivalent substitutions, or other modifications of the preferred embodiments described herein are obviously possible in light of the description, without departing from the spirit of the invention. Accordingly, the invention is to be limited only as indicated by the scope of the appended claims.

I claim:

1. A method for automatically developing software according to a prespecified software performance in response to variations on a prescribed number m of selected control variables related to the software performance, m being an integer which is at least 7, comprising:
   automatically planning a software experiment involving a set of n statistically designed software tests for testing in said n tests said m selected control variables, n being an integer greater than m, said n tests being centered around a specified experimental point in an m-dimensional experimental space;
   performing said n designed software tests to collect experimental software performance results;
   determining from said n experimental results the combination of said m variables which optimizes said prespecified software performance;
   setting and coding in the developed software the conditions of said m variables at the thus-determined optimum variables combination; and
   saving the thus-developed software in a software storage device.

2. A method as in claim 1 including the additional step of coupling the automatic planning, performing, determining, setting and coding, and saving steps for recycling said automatic software experiment to achieve self-optimized software.

3. A method as in claim 2 wherein except for the first software experiment cycle, said planning step comprises automatically replanning a new designed experiment centered around the optimizing variables combination in the immediately previous cycle.

4. A method as in claim 2 for operation without human performing at least one of the tasks selected from the group consisting of assigning a value to each test result, deciding selection criteria for choosing test samples or entities according to the assigned values, and choosing an operation to be performed during the software development.

5. A method as in claim 2 wherein said planning step comprises automatically planning said n designed tests in which each of said m selected control variables is systematically, not randomly, varied in all the n tests.

6. A method as in claim 2 wherein said automatic planning, performing, determining, setting and coding, and saving steps are performed with the only human knowledge base required being the number, location in the software, and permitted ranges of the m control variables.

7. A method as in claim 2 wherein said planning step comprises automatically planning the statistically designed, n-test software experiment in the form of a fractional factorial type.

8. A method as in claim 2 wherein said determining step comprises climbing along the steepest ascent path on a m-dimensional performance response surface in the search for the optimizing variables combination.

9. A method as in claim 2 wherein said determining step comprises systematically, fractionally but uniformly searching for said optimizing variables combination within the entire m-dimensional experimental space.

10. A method as in claim 2 wherein said automatic planning step comprises selecting a value of n which is no more than one-sixteenth of the required number to completely cover all the nodes in the m-dimensional experimental space.

11. A method as in claim 2 including the additional step of selecting a single computing system to perform said automatic planning, performing, determining, setting and coding, and saving steps.

12. A method as in claim 11 wherein said selecting step comprises selecting a personal computer as said single computing system.

13. A method as in claim 2 for developing the software to be used for or training educating a living object, wherein said selecting step comprises selecting a multimedia computer, and wherein said control variables are selected from the group consisting of type, intensity, and tempo of sound or noise, smell, lighting, temperature, humidity, pressure, visual display, and other factors that stimulate the object physically, mentally, psychologically, and physiologically, and wherein said performance relates to the physical, mental, psychological, or physiological condition of the object.

14. A method as in claim 2 for developing the software to be used in improving a living object, wherein said control variables are selected from the group consisting of type, intensity, and tempo of sound or noise, smell, lighting, temperature, humidity, pressure, visual display, and other factors that stimulate the object physically, mentally, psychologically, and physiologically, and wherein said performance criterion relates to the physical, mental, psychological, or physiological condition of the object.

15. A method as in claim 2 for developing the software to be used in cases where interactions exist among said selected control variables and wherein said determining step comprises automatically analyzing these interactions in the determination of the optimizing variables combination.

16. A method as in claim 2 for developing the software to be of a type selected from the group consisting of computer operating software and computer application software.

17. A method as in claim 2 wherein said prespecified software performance relates to at least one software feature selected from the group consisting of cost of development, productivity, smallness, accuracy, efficiency, utility, reliability, robustness, maintainability, flexibility, memory requirement, output quality, and computing or analyzing speed.

18. A method as in claim 2 including selecting said software control variables from the group consisting of number, location, initial point, ending point, and step size of at least one do loop in the software, number, type, and location of subroutines, and relational or logical operators.

19. A method as in claim 2 for developing the software to be used in improving or optimizing a specific growth performance of a growing object or creature and wherein said control variables are growth-controlling variables selected from the group consisting of equipment, materials, parts, procedures, and environment.

20. A machine for the automatic development of software according to a prespecified software performance in response to variations on a prescribed number m of selected control variables related to the software performance, m being an integer which is at least 7, said development being accomplished through computerized automatic software experimentation for systematically or non-randomly and uniformly searching for an optimizing variables combination in an m-dimensional experimental space, comprising:
means for automatically planning a software experiment involving a set of n statistically designed software tests for searching in said m-dimensional space, n being an integer greater than m, said n tests being centered around a specified experimental point in said m-dimensional space;
means for performing said n designed software tests to collect experimental software performance results for these tests;
means for determining from said n experimental results that combination of said m variables which optimizes said prespecified software performance;
means for setting and coding in the developed software the conditions of said m variables at the thus-determined optimum variables combination; and
means for saving the thus-developed software in a software storage device.

21. A machine as in claim 20 including means for coupling the planning, performing, determining, setting and coding, and saving means for recycling with feedback control to achieve the self-optimized software through the use of multiple, recycled optimizing designed experiments.

22. A machine as in claim 21 wherein except for the first optimizing software experiment said planning means comprises means for replanning a new designed experiment centered around the optimizing variables combination in the immediately previous cycle.

23. A machine as in claim 21 in which the only human knowledge base required for its operation is the number, location in the software, and permitted ranges of the m control variables.

24. A machine as in claim 21 wherein said planning means comprises means for automatically planning said n designed tests in which each of said m selected control variables is systematically, not randomly, varied in all the n tests.

25. A machine as in claim 21 wherein said planning means comprises means for automatically planning plans the statistically designed, n-test software experiment in the form of a fractional factorial type.

26. A machine as in claim 21 wherein said determining means comprises means for climbing the steepest ascent path on an m-dimensional performance response surface.

27. A machine as in claim 21 wherein n is no more than one-sixteenth of the required number to completely cover all the nodes in said m-dimensional space.

28. A machine as in claim 21 including a single computing system to provide said planning, performing, determining, setting and coding, and saving means.

29. A machine as in claim 28 wherein said single computing system is a personal computer.

30. A machine as in claim 21 for developing the software to be used for educating a living object, wherein said single computing system is a multimedia computer and wherein said selected control variables are selected from the group consisting of type, intensity, and tempo of sound or noise, smell, lighting, temperature, humidity, pressure, visual display, and other factors that stimulate the object physically, mentally, psychologically, and physiologically, and wherein said performance relates to the physical, mental, psychological, or physiological condition of the object.

31. A machine as in claim 21 for uses in cases where interactions exist among said selected control variables and wherein said determining means comprises means for automatically analyzing these interactions in the determination of the optimizing variables combination.

32. A machine as in claim 21 wherein said software to be developed is of a type selected from the group consisting of computer operating software and computer application software.

33. A machine as in claim 21 wherein said prespecified software performance relates to at least one software feature selected from the group consisting of cost of development, productivity, smallness, accuracy, efficiency, utility, reliability, robustness, maintainability, flexibility, memory requirement, output quality, and computing or analyzing speed.

34. A machine as in claim 21 wherein said software control variables are selected from the group consisting of number, location, initial point, ending point, and step size of at least one do loops in the software, number, type, and location of subroutines and relational or logical operators.

35. A method for automatically developing, in real time, software relative to a specific performance of the software to be improved or optimized comprising:

performing at least one automatic, computerized software experiment involving a plurality of selected control variables which affect the specific performance;

computer-analyzing, in real time, the experimental results to determine the best combination of the selected control variables for achieving computerized optimization or the most known improvement at the time of said computerized experiment;

setting and coding in the developed software the conditions of said selected control variables at the thus-determined optimum or most known improved variables combination; and saving the thus-generated software in a software storage device.

36. A method as in claim 35 including the additional steps of:

instantly feeding back information on the status of improvement or optimization of said specific performance;

reperforming at least one more similar automatic computerized software experiment; and computer-reanalyzing, in real time, the new experimental results to acquire newer and better improvement or optimization;

resetting and recoding in the developed software the new conditions of said variables at the thus-determined, new optimum or most known improved variables combination; and resaving the thus-generated improved software in the software storage device.

37. A method as in claim 36 wherein said reperforming step after the first computerized experiment comprises performing said subsequent at least one computerized experiment centered around the best variables combination determined in the immediately previous computerized experiment.

38. A method as in claim 37 wherein the number of said selected control variables is at least 7.

39. A method as in claim 37 wherein each of said automatic, computerized software experiments comprising said performing or reperforming step, computer-analyzing or computer-reanalyzing step, setting and coding or resetting and recoding step, and saving or resaving step is finished within a minute.

40. A method as in claim 37 wherein said computer-analyzing or reanalyzing step comprises computer-analyzing or reanalyzing the experimental results within a time selected from the group consisting of 1.79 milliseconds and 1.79 microseconds.

41. A method as in claim 37 wherein said computer-analyzing and reanalyzing steps comprise computer-determining the effect, at different times of the successive automatic computerized experiments, of at least one of said selected control variables to achieve a serial time effect of the at least one selected control variable.

42. A method as in claim 37 wherein all the automatic computerized software experiments are performed without any human involvement in a form selected from the group consisting of human control, human supervision, human guidance, and supply of human knowledge bases other than providing the number and type of said selected control variables, and their allowable ranges.

43. A method as in claim 37 wherein said software is a multi-media software.

44. A method as in claim 37 for developing software used to improve the physical or mental condition of a living object;

wherein said control variables are selected from the group consisting of the sex, age, and background of the object; time of the day or week; video and audio signals including those from recorded tapes; environmental factors including lighting, temperature, humidity, smell, noise, and pressure testing material or equipment; and encouragement rewards; and wherein said specific performance is selected from the group consisting of the speed or cost of improvement and maximum improvement in the physical or mental condition of the object.

* * * * *